United States Patent

Abel

[11] 3,774,058
[45] Nov. 20, 1973

[54] FORCE TRANSDUCER
[75] Inventor: Martin Louis Abel, Franklin, Mich.
[73] Assignee: Permawick Company, Inc., Detroit, Mich.
[22] Filed: June 30, 1972
[21] Appl. No.: 268,081

[52] U.S. Cl. .................................... 310/15, 336/30
[51] Int. Cl. ...................... H02k 33/00, H02k 35/06
[58] Field of Search .................. 310/12, 15; 336/30; 323/51

[56] References Cited
UNITED STATES PATENTS

| | | | |
|---|---|---|---|
| 3,633,053 | 1/1972 | Peters | 310/15 |
| 3,024,374 | 3/1962 | Strarder | 310/15 |
| 3,129,347 | 4/1964 | Tognola | 310/15 |
| 3,132,268 | 5/1964 | Abel et al. | 310/15 |
| 3,453,573 | 7/1969 | Kyle | 336/30 |
| 3,463,946 | 8/1969 | Zimmerman | 310/15 |
| 3,398,302 | 8/1968 | Harnau et al. | 310/14 |
| 3,351,850 | 11/1967 | Crawford et al. | 323/51 |

Primary Examiner—J. D. Miller
Assistant Examiner—Mark O. Budd
Attorney—Joseph M. Lane et al.

[57] ABSTRACT

A movable armature is arranged between a pair of juxtaposed permanent magnet assemblies each carrying a respective pair of electrical coils. The armature is slidably connected to a two-way motion transmitting mechanism which is subjected to the force or movement to be sensed. The motion transmitting mechanism is adapted to push the armature toward either one of the magnet assemblies until at a predetermined spacing, the magnetic attraction is sufficient to accelerate the armature into engagement with the magnet assembly. The coils are electrically connected such that the current induced by the flux change during the armature acceleration is additive and of opposite polarity, but equal magnitude, depending on the direction of acceleration of the armature.

16 Claims, 8 Drawing Figures

FORCE TRANSDUCER

BACKGROUND OF THE INVENTION

The invention relates generally to position or force sensing devices, and more particularly to devices for producing an electrical control signal when a moving element reaches a precisely determined position.

In automatic machine systems, it is often necessary to change the operation of a machine when a predetermined position or force level is reached. For example, the machine may be designed to stop abruptly when the force on the workpiece attains a critical level. In many applications, the machine can be controlled with sufficient accuracy by an ordinary mechanical switch having electrical contacts operated by a moving element whose position is to be sensed. Where reliability and repeatable accuracy are required, conventional contact switches are not universally suitable. Over a long period of operation, the contact surfaces are altered by wear and corrosion, changing the exact point at which the electrical circuit is made or broken.

In U.S. Pat. No. 3,132,268 to Abel et al., issued May 5, 1964, a signal-generating force or position transducer is disclosed which overcomes many of the defects of contact switches in machine control applications. An independently movable armature is arranged to be pushed toward a permanent magnet by a machine element whose position is to be sensed. The armature finally reaches a predetermined spacing from the magnet's surface at which the magnetic force suddenly accelerates the armature toward the magnet. The total magnetic flux increases abruptly because the armature, made of soft iron, serves as a "keeper" for the magnetic field. This flux change induces a current pulse in a pair of electrical coils connected to the magnet. The current pulse is available as a control signal for the machine. If the movable machine element reversed its motion and travelled far enough in the opposite direction, a spring connected between the armature and an actuating element, would eventually jerk the armature off of the magnet. A current pulse of opposite polarity resulted; but the magnitude of the pulse was dependent on the spring and usually differed from that of the pulse when the armature snapped into engagement with the magnet. The spring also hindered the acceleration of the armature toward the magnet since the opposing spring force increased as the armature approached the magnetic surface.

SUMMARY OF THE INVENTION

Accordingly, the general purpose of the invention is to improve transducers of the type employing an armature movable into and out of engagement with a magnet having a flux sensing coil. Another object of the invention is to provide a signal generator which produces a positive pulse when an element moving in one direction passes a predetermined point and a negative pulse of the same magnitude when the moving element travels in the other direction past a second predetermined point regardless of the rate of travel. A further object of the invention is to permit relatively unhindered axial movement of the armature toward the magnet.

The applicant has discovered that these and other objects are achieved by arranging a movable armature between a pair of adjacent permanent magnet assemblies each carrying a respective pair of electrical coils. The armature is slidably connected to a two-way motion transmitting actuating element which is subjected to the force or movement to be sensed. No spring is required between the actuating element and armature. The actuating element is adapted to push the armature toward either one of the magnet assemblies until, at a precisely predetermined spacing, the magnetic attraction is sufficient to accelerate the armature into engagement with the corresponding magnet assembly. The forward acceleration is opposed only by small frictional losses and by the magnetic force of the other magnet assembly, which decreases as the armature approaches the attracting magnet's surface. The coils are electrically interconnected such that the current induced by the flux change during acceleration of the armature is additive and of opposite polarity, but equal magnitude, depending on the direction of the armature's acceleration.

In the embodiment described below, the actuating element includes a pair of interconnected shafts with longitudinal portions of reduced diameter received by respective apertures formed in the armature on opposite sides of the gap between the magnet assemblies. A predetermined amount of lost motion or play in the axial direction between the armature and the shafts is provided, permitting the armature to be independently snapped into engagement with either one of the magnet assemblies after it has been pushed close enough by the shafts.

The four coils are connected in series in the described embodiment and provide a switching signal for a reed switch which serves as a bistable memory to operate a triac-controlled load or other suitable utilization circuit.

BRIEF DESCRIPTION OF THE DRAWINGS

FIG. 3 is a sectional view taken along lines 3—3 of FIG. 2a.

DESCRIPTION OF THE PREFERRED EMBODIMENT

Figure 1:
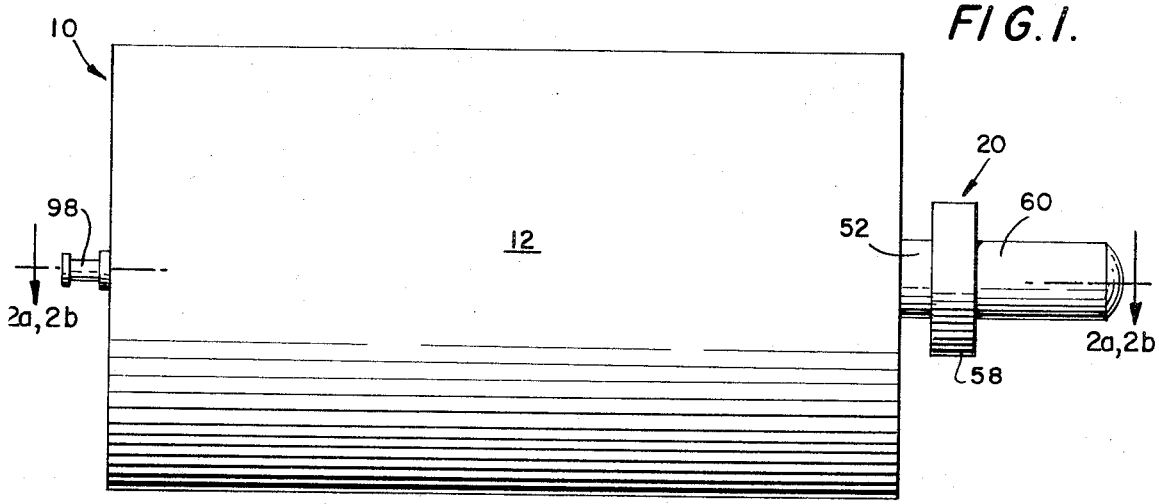
FIG. 1 is a side view of an embodiment of the transducer constructed according to the invention.
Figure 2A:
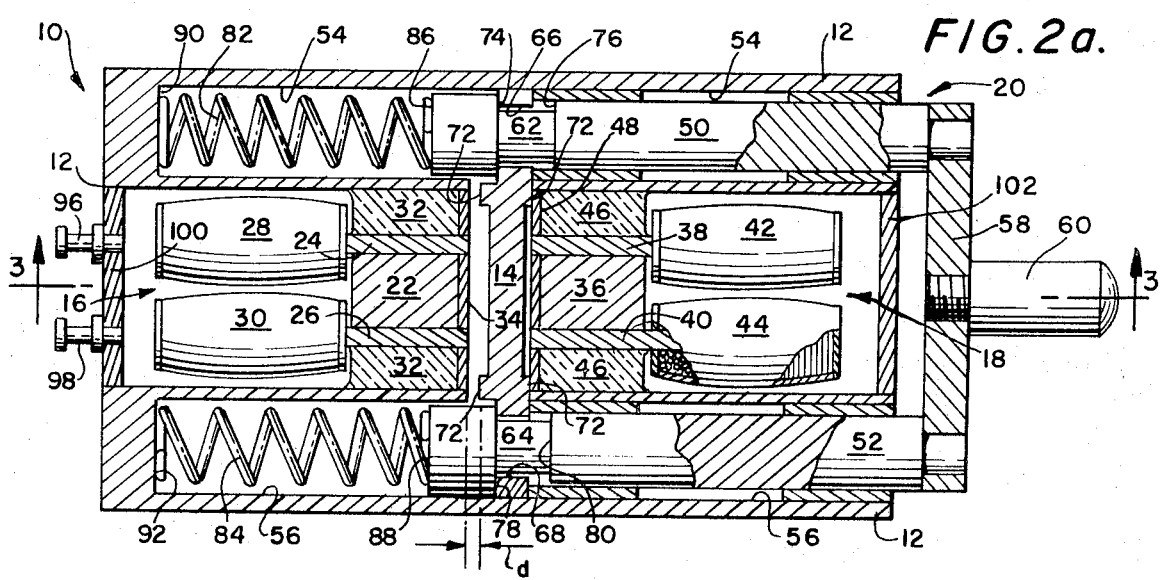
FIGS. 2a and 2b represent similar sectional views taken along lines 2a, 2b–2a,2b of FIG. 1 showing the apparatus in two different states.
Figure 2B:
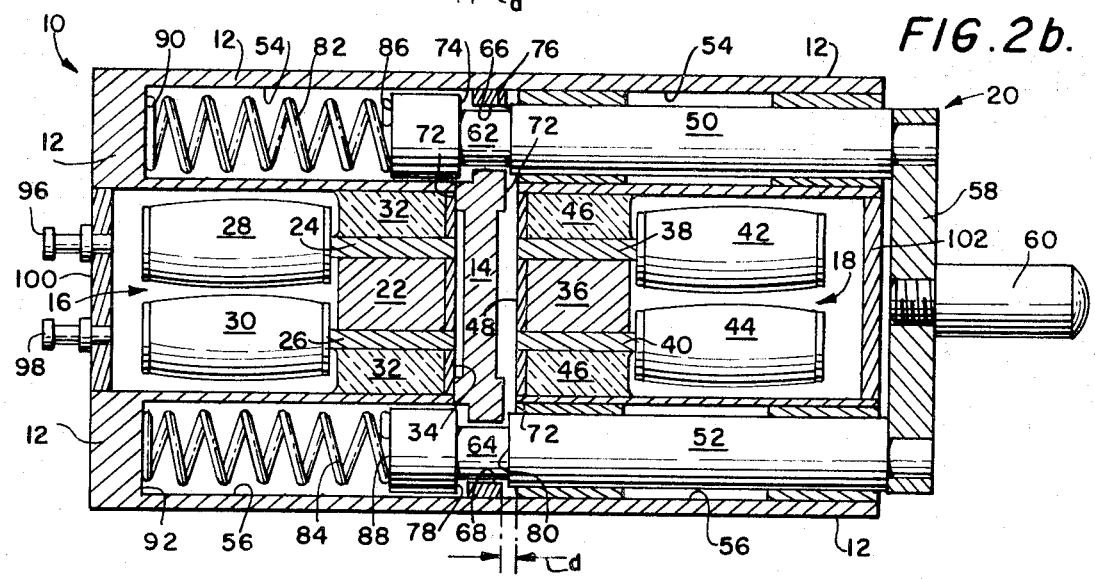
Figure 3:
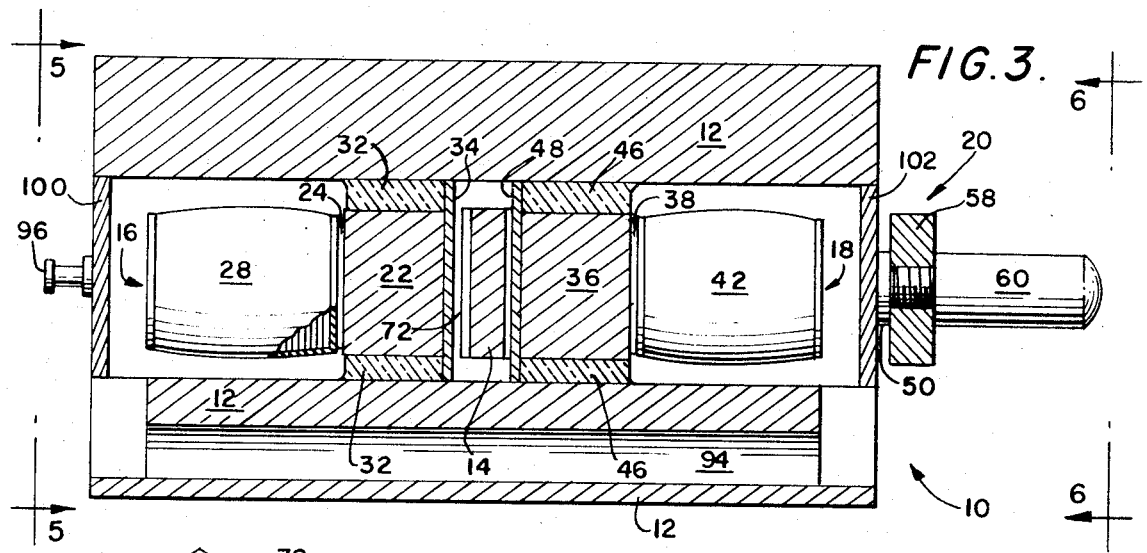

In FIGS. 1–3 a force transducer 10 comprises a thick-walled cylindrical housing 12 containing an axially movable armature 14 disposed between a pair of rigidly mounted axially spaced magnet assemblies 16 and 18, and axially movable actuating element 20 slidably connected to the armature 14. The transducer 10 is designed to produce an electrical output pulse, corresponding to an instantaneous change in the magnetic field provided by the magnet assemblies 16 and 18, indicative of a precise position of an object (not shown) engaging the actuating element 20.

The magnet assembly 16 includes a permanent bar magnet 22 centered approximately on the axis of the housing 12 with its polar axis running perpendicular thereto. A pair of elongated pole pieces 24 and 26 parallel to the housing axis are attached to opposite sides of the magnet 22, such that the magnet's north and south poles face the pole pieces respectively. One end of each pole piece extends slightly beyond the magnet 22 and the other end extends away from the magnet 22 toward the end of the housing 12. The pole pieces 24 and 26 carry respectivve electrical coils or windings 28 and 30 located between the magnet 22 and the aforementioned end of the housing 12. The magnet 22 and adjacent ends of the pole pieces 26 and 28 are secured by a bonding material 32, such as epoxy, to a potting disc 34 fitted transversely in the housing 12. The potting disc 34 is slotted to receive the adjacent ends of the pole pieces 24 and 26.

The other magnet assembly 18 is axially aligned with and spaced from the assembly 16 within the housing 12. The magnet assembly 18 is identical componentwise to the assembly 16 and symmetrical therewith about a line perpendicular to the housing axis midway between the assemblies 16 and 18. Accordingly, assembly 18 has a magnet 36 with a pair of pole pieces 38 and 40 attached to its north and south pole faces carrying respective coils 42 and 44. The magnet 36 with its pole pieces 38 and 40 is secured by bonding material 46 to a transversely disposed potting disc 48 spaced from and parallel to the other potting disc 34.

The movable actuating element 20 comprises a pair of parallel shafts 50 and 52 received respectively in a pair of parallel longitudinal bores 54 and 56 formed on opposite sides in the housing 12. Corresponding ends of the shafts 50 and 52 protrude out of their respective bores at one end of the housing 12 and are rigidly connected together by a yoke member 58 external and adjacent to the corresponding end of the housing 12. The yoke member 58 has a centrally mounted contact button 60. The shafts 50 and 52 have corresponding intermediate longitudinal portions 62 and 64 of reduced diameter, approximately aligned with the gap between the potting discs 34 and 48.

Figure 4:
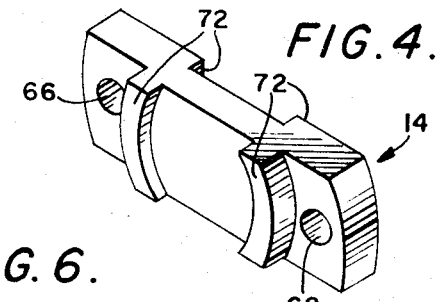
FIG. 4 is an isometric view of the armature in the embodiment of FIG. 1.

The movable armature 14, made of a ferromagnetic material such as soft iron, is disposed in the gap between the discs 34 and 48, and is movable therebetween, by a distance d, into and out of contact with the discs. The armature 14 has apertures 66 and 68 (FIG. 4) formed in opposite ends for loosely receiving the shaft portions 62 and 64 respectively. Transverse slots are formed in opposite interior sides of the housing 12 so that the ends of the armature 14 can engage the shaft portions 62 and 64. The width of the ends of the armature 14 which engage the respective shaft portions 62 and 64 is less than the length of each shaft portion 62 and 64, so that there is lost motion or play between the armature 14 and the actuating element 20. Raised shoulders 72 (FIG. 4) are formed on either side of the armature 14 for engaging the discs 34 and 48 and adjacent edges of the housing 12 to prevent the armature 14 from making damaging contact with the magnet assemblies 16 and 18.

The intermediate shaft portion 62 terminates in a transverse working surface 74, where the shaft 50 resumes its full diameter, at one end and at the other end in an opposing working surface 76. Similarly, the corresponding shaft portion 64 terminates in opposing working surfaces 78 and 80. The working surfaces 74, 76, 78 and 80 are larger than the corresponding apertures 66 and 68 in the armature 14. Therefore, when the actuating element 20 is moved to the right (as viewed in FIGS. 2a and 2b) the armature 14 remains stationary until the corresponding working surfaces 74 and 78 contact the armature 14, at which time the armature 14 begins to move with the actuating element 20. Likewise, when the actuating element 20 is moved to the left, the armature 14 remains stationary until the working surfaces 76 and 80 contact the armature 14 causing it to move with the element 20 to the left.

A pair of springs 82 and 84 are confined respectively within the portions of the bores 54 and 56 not occupied by the shafts 50 and 52, between the free ends 86 and 88 of the shafts 50 and 52 and the corresponding opposing ends 90 and 92 of the bores 54 and 56. If the bores 54 and 56 are formed all the way through the housing 12, they may be terminated at 90 and 92 by means of insertable plugs. The action of the springs 82 and 84 against the shaft ends 86 and 88 urges the actuating element 20 out of the housing 12. The force of the springs 82 and 84 should be sufficient to overcome the attraction of the armature 14 to the magnet 22. Thus, with no mechanical input to the contact button 60, the actuating element 20 would press to the right against the armature 14, which in turn, would be held against the magnet 36, as shown in FIG. 2a.

Figure 5:
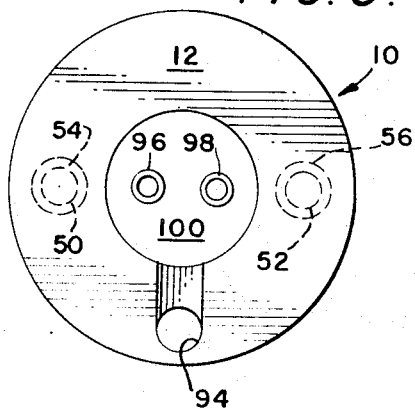
FIG. 5 is an end view of the transducer taken along lines 5—5 of FIG. 3.
Figure 6:
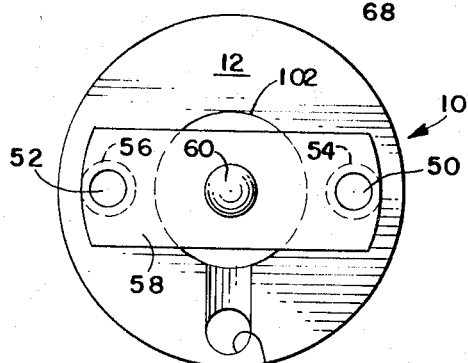
FIG. 6 is a view of the other end of the transducer taken along lines 6—6 of FIG. 3.

The electrical connections between the coils in the magnet assemblies 16 and 18 are made through a wiring channel 94 provided longitudinally through the housing 12, as seen in FIGS. 3, 5 and 6. A pair of electrical output terminals 96 and 98 are located on a disc 100 enclosing the end of the housing associated with the bore ends 90 and 92. Another disc 102 closes the housing end adjacent to the contact button 60.

Figure 7:
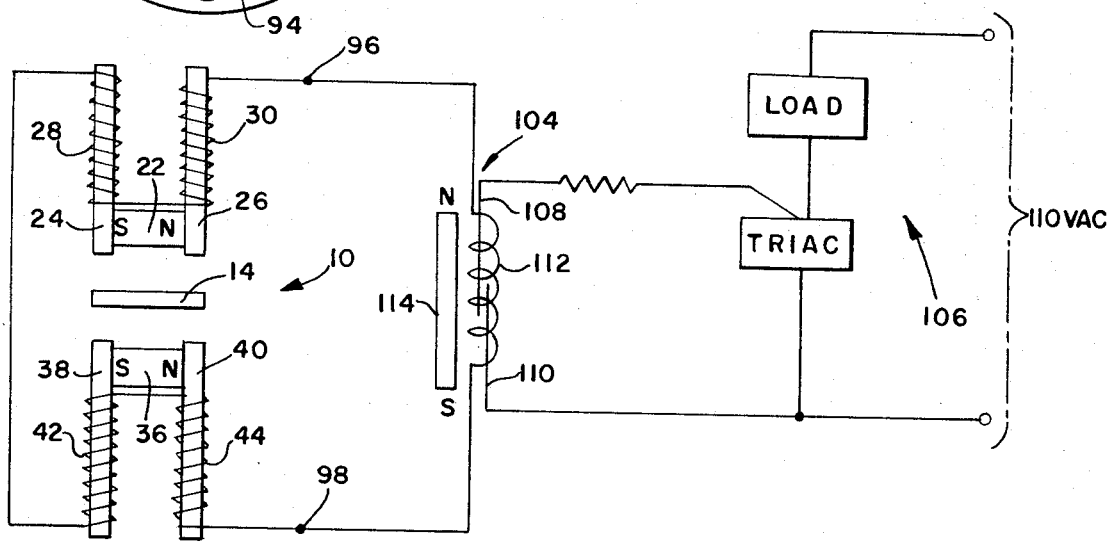
FIG. 7 is a schematic and block diagram illustrating the transducer of FIG. 1 in connection with a reed switch and a specific utilization circuit.

In the circuit diagram of FIG. 7, the electrical connection of the coils 28, 30, 42 and 44 in the transducer 10 are shown, together with a reed switch 104 and a suitable output utilization circuit 106. The four coils are appropriately wound and connected in series such that when the armature 14 is accelerated by the magnetic attraction of one of the magnet assemblies 16 and 18, the current produced in the corresponding coils, by virtue of the changing magnetic flux, is additive and in one direction, positive or negative. Likewise, when the armature 14 is accelerated toward the other magnet assembly, current induced in the coils by virtue of the changing magnetic flux is additive in the opposite direction.

The reed switch 104 has normally open, resilient ferromagnetic contacts 108 and 110 operated by a coil 112 surrounding the contacts and a permanent bar magnet 114 adjacent to the contacts. If the contacts 108 and 110 are closed by a current pulse in the coil 112, they will remain closed even in the absence of current through the coil 112 because of the stationary magnetic field produced by the magnet 114. The reed switch contacts 108 and 110 are connected to operate a triac-controlled 110 volt AC load forming the utilization circuit 106.

In operation, as the actuating element 20 is moved to the left from the nominal starting position shown in FIG. 2a, the corresponding working surfaces 76 and 80 come in contact with the armature 14 causing it to move to the left away from the magnet 36. When the armature 14 has reached a precisely determined position between the discs 34 and 48, the magnetic attraction between the armature 14 and the other magnet 22 takes control of the motion of the armature 14 and accelerates the armature toward the magnet 22, snapping it into engagement therewith as shown in FIG. 2b. While the armature 14 is accelerating toward the magnet 22, the magnetic flux changes rapidly. The flux is coupled to the coils 28 and 30 by the pole pieces 24 and 26. The changing flux through the coils 28 and 30 induces electrical current therein. The wave form of the current induced in the coils approximates the change in velocity of the armature 14. That is, the current is at a peak level approximately when the armature 14 is travelling most rapidly. By the time the armature 14 finally comes to rest with its shoulders 72 abutting the disc 34, the current has reduced to zero, since the magnetic flux has stopped changing.

If the transducer 10 is wired as shown in FIG. 7 and connected to the reed switch 104, the current pulse will be conducted through the coil 112 to close the normally open contacts 108 and 110. After the current has subsided, the contacts remain closed because of the magnet 114. Now, if the operation is repeated in the reverse direction, with the actuating element 20 moving to the right, the working surfaces 74 and 78 will push the armature 14 from the magnet 22 to the right so that the magnet 36 can accelerate the armature 14 into engagement. The resulting current pulse induced in coils 42 and 44 (magnet assembly 18) is in the opposite direction. The current through the reed switch coil 112 produces the requisite magnetic field to reopen the contacts 108 and 110. When the negative pulse has subsided the contacts 100 and 110 will remain open. The reed switch 104 forms a bi-stable magnetic memory which retains the direction of the preceding actuation of the transducer 10 without requiring a continuous power input.

In a working transducer constructed according to the invention, a suitable distance d (FIGS. 2a and 2b) for the armature 14 to travel between the magnets 22 and 36 was found to be five thousandths of an inch. The accuracy of the point at which acceleration occurred was determined to be ± five ten thousandths of an inch.

It should be noted that the springs in transducer 10 play no part in the actual acceleration of the armature. Their primary function is to maintain positive contact between the contact button and the object whose position is being sensed. The springs may therefore be omitted in many applications, where, for example, the actuating element is interconnected with the object in some manner.

The springs in the transducer 10, if required, may be located elsewhere to urge the actuating element in an axial direction. The described configuration of the armature is not critical, but is preferred because the shoulders 72 tend to reduce wear. Nor is the sliding connection between the actuating element and the armature restricted to the form disclosed herein. It is necessary only that the connection be capable of both transmitting motion to the armature in either of two directions and allowing the armature to undergo independent magnetic acceleration at a predetermined spacing.

The invention provides distinct advantages over prior art transducers. High reliability and adjustment-free operation are retained due to the fact that the electrical output is not produced by closure of conductive contacts. A large number of repeated actuations does not change the point at which the output pulse occurs because the pulse depends on spacing rather than contact between two electrical elements. Acceleration of the armature is opposed only by low frictional losses and the decreasing attraction of the opposite magnet. Thus, higher acceleration and faster actuation are obtainable than with previous devices. The invention also provides output pulses of uniform magnitude in either direction independent of the rate of movement of the actuating element. Because of the symmetry of the device, the pulses are dependent on the same magnetic acceleration in both directions.

It will be understood that various changes in the details, materials, steps and arrangements of parts which have been herein described and illustrated in order to explain the nature of the invention, may be made by those skilled in the art within the principle and scope of the invention as expressed in the appended claims.

What is claimed is:

1. A transducer for producing an electrical output signal indicative of a condition to be sensed, comprising a pair of spaced magnets, an armature movable between said magnets, two-way motion transmitting means for moving said armature both forward and backward between said magnets, said armature being free to move independently in the same direction as said armature is being moved by said motion transmitting means so that said armature is accelerated independently of said motion transmitting means by the magnetic attraction of either one of said magnets when said armature is at a predetermined spacing therefrom, and means for producing said electrical output signal in response to the change in flux associated with either one of said magnets during acceleration of said armature.

2. The transducer of claim 1, wherein said means for producing an electrical output includes at least one coil operatively associated with each magnet.

3. The transducer of claim 2, further comprising at least one pole piece attached to each said magnet, said coil being disposed on said pole piece.

4. The transducer of claim 1, wherein the magnetic poles of said magnets are both aligned perpendicularly with respect to the distance between said magnets.

5. The transducer of claim 4, wherein said means for producing an electrical output signal includes a pair of pole pieces attached respectively to either end of each said magnet at the magnetic poles thereof, and an electrical coil operatively disposed on each said pole piece.

6. The transducer of claim 5, wherein said coils are interconnected such that the current induced in said coils during a given acceleration of said armature is in the same direction.

7. The transducer of claim 5, wherein said coils are interconnected such that the current induced through said coils is in one direction when said armature is accelerated toward one of said magnets and in the other direction when said armature is accelerated toward the other one of said magnets.

8. The transducer of claim 7, wherein the magnitude of the current through said coils is approximately the same when said armature is accelerated toward either one of said magnets.

9. The transducer of claim 1, wherein said motion transmitting means includes a pair of parallel shafts arranged on each side of said pair of magnets and connected together for longitudinal movement, each said shaft having an intermediate portion of reduced width adjacent to the gap between said magnets, said armature having a pair of apertures formed therein respectively slidably receiving said intermediate portions of said shafts, the length of said intermediate portions being sufficient to permit confined independent movement of said armature with respect to said shafts.

10. The transducer of claim 9, wherein said actuating means further includes resilient means operatively disposed to urge said shafts longitudinally in one direction.

11. A transducer for producing an electrical output signal indicative of a condition to be sensed, comprising two magnets in spaced adjacency, an armature movable between said magnets, actuating means having a pair of interconnected working surfaces for pushing said armature between said magnets in opposite directions corresponding to a change in an object whose condition is being sensed, the distance between said working surfaces providing confined independent movement of said armature with respect to said actuating means so that said armature is accelerated independently of said actuating means by the attraction of either one of said magnets when said armature is spaced a predetermined distance therefrom, and means for producing said electrical output signal in response to the change in flux associated with either one of said magnets during acceleration of said armature.

12. A transducer for sensing a condition and producing an electrical output pulse in response thereto, comprising a pair of magnets spaced from each other, an electrical coil operatively associated with each said magnet for sensing flux changes, an armature movably disposed between said magnets, an actuating element positionally responsive to the object whose condition is being sensed, and two-way motion transmitting means operatively connected between said armature and said actuating element for moving said armature toward either one of said magnets until said armature is spaced therefrom by a predetermined distance whereupon the magnetic attraction of said magnet accelerates said armature toward said magnet thereby inducing current in said coil associated therewith.

13. A transducer, comprising magnetic means for producing two adjacent regions of high magnetic flux density, a ferromagnetic member movable between said regions, actuating means for pushing said member both forward and backward between said regions in a direction corresponding to a change in an object whose condition is being sensed, said member being accelerated independently of said actuating means by either one of said magnetic regions when said member is at a respective predetermined location between said regions, and means for producing an electric output signal in response to the change in flux associated with either one of said regions during acceleration of said member.

14. A transducer for producing an electrical output signal indicative of a condition to be sensed, comprising two spaced magnets, an armature movable between said magnets, two-way motion transmitting means for moving said armature between said magnets in either direction and for permitting independent acceleration of said armature in the direction of movement such that said armature is accelerated by magnetic attraction toward either one of said magnets at a predetermined spacing therefrom, and means for producing said electrical output signal in response to the change in flux associated with either one of said magnets during acceleration of said armature thereto.

15. A transducer, comprising a movable armature, means for selectively moving said armature in either of two directions and allowing indpendent acceleration thereof in the direction of said movement, means for subjecting said armature to the same amount of magnetic acceleration in either of said two directions depending on the position of said armature, and means for producing an output signal in response to said acceleration.

16. The transducer of claim 12, wherein said coils are interconnected such that the current induced therein is additive for a given acceleration of said armature and of opposite polarity for respective opposite directions of acceleration of said armature.

* * * * *